United States Patent Office 3,283,008
Patented Nov. 1, 1966

3,283,008
PROCESS FOR THE PREPARATION OF 3-KETO-BUTYRALDEHYDE DIMETHYLACETAL-(1)
Hans Niedenbruck and Walter Stumpf, Marl, Germany, assignors to Chemische Werke Huls Aktiengesellschaft, Marl, Germany
No Drawing. Filed Aug. 23, 1963, Ser. No. 304,273
Claims priority, application Germany, Sept. 14, 1962, C 27,931
6 Claims. (Cl. 260—594)

This invention relates to an improved process for the preparation of 3-keto-butyraldehyde-dimethylacetal-(1) having the formula:

$$CH_3-CO-CH_2-CH(OCH_3)_2$$

The production of 3-ketobutyraldehyde-dimethylacetal-(1) by reaction of 1-methoxy-butene-(1)-yne-(3) with methanol in the presence of water and mineral acids is taught in German Patent 881,941. The 3-ketobutyraldehyde-dimethylacetal-(1) thus produced always contains, however, 10 to 15% 1-methoxybutenone-(3) as a by-product. For reactions with the keto-group of the 3-ketobutyraldehyde-dimethylacetal-(1), for the purpose of lengthening the carbon chains of other molecules with the simultaneous introduction of an (acetylized) aldehyde group, the content of 1-methoxy-butenone is very deleterious because its CO-group leads to the production of undesired by-products. It is not possible to separate 1-methoxy-butenone-(3) from 3-ketobutyraldehyde-dimethylacetal by distillation because the boiling points of these compounds are very close to one another. Furthermore, upon prolonged heating, 3-ketobutyraldehyde-dimethylacetal-(1), especially in the presence of iron, will split off a molecule of methanol and be thus converted into 1-methoxybutenone-(3). Various efforts have, therefore, been made to separate the unsaturated ketone from the acetal by chemical methods. In each case, however, this necessitated an additional step in the process, and naturally also resulted in some loss of the desired acetal.

The object of this invention, therefore, is to provide a novel and more efficient process for the production of 3-ketobutyraldehyde-dimethylacetal-(1), particularly with respect to a lower by-product production of 1-methoxy-butenone-(3).

Upon further study of the specification and claims, other objects and advantages of the present invention will become apparent.

To attain these objects, it has been unexpectedly discovered that 3-ketobutyraldehyde-dimethylacetal-(1) with a lower concentration, even less than 3%, of 1-methoxy-butenone-(3) can be produced in a simple and economical manner by reaction of 1-methoxy-butene-(1)-yne-(3) with methanol and water in the presence of mineral acids at moderately elevated temperatures, followed by neutralization and the usual separation of the material, if the reaction product, before its neutralization and separation, is cooled to about 0° C. to 30° C., and while at such temperature is allowed to react further.

Accordingly, the process of this invention comprises the steps of (1) reacting 1-methoxy-butene-(1)-yne-(3) with methanol and water in the presence of a mineral acid at a temperature of about 60–75° C., to produce said 3-ketobutyraldehyde-dimethylacetal-(1) and as a by-product 1-methoxybutenone-(3); (2) lowering the reaction temperature to about 0–30° C.; (3) maintaining the reaction mixture at 0–30° C. for a sufficient time to lower the concentration of said 1-methoxybutenone-(3) to a predetermined upper limit; and (4) neutralizing the reaction mixture.

Step (1) of this invention is conducted substantially in accordance with the process described in German Patent 881,941; however, the temperature range in this first step of this invention is 60–75°, preferably 70–73°, and the reaction time is preferably 0.5–3.0, particularly 1–2 hours.

In step (2), the reaction mixture is cooled, usually to 0–30° C., preferably 5–20° C. At this lower temperature, the reaction mixture is maintained for a time sufficient to convert the deleterious by-product 1-methoxy-butenone-(3) into 3-ketobutyraldehyde-dimethylacetal-(1).

Step (3) is continued preferably for at least 4 hours, more preferably at least 8 hours to reduce the concentration of 1-methoxybutenone-(3) to very low values. Longer reaction times lead to a further reduction in the amount of 1-methoxybutenone-(3) and hence to an improvement in the quality of 3-ketobutyraldehyde-dimethylacetal-(1). Step (3) is terminated and the reaction mixture is then neutralized and worked up in the usual manner as soon as the amount of 1-methoxybutenone-(3) is reduced to the desired level which is indicated by the intensity of the corresponding infra-red absorption bands of 6.15 and 6.25μ. Step (3) proceeds in the simplest manner and the reaction mixture need only be cooled to room temperature and allowed to remain standing at such temperature, without being stirred or otherwise attended to.

With the process of this invention, it is possible to produce 3-ketobutyraldehyde-dimethylacetal-(1) with less than 3% of 1-methoxybutenone-(3) in a surprisingly simple and economical manner.

In a continuous process, which can be conducted on a commercial scale, the steps can be conducted in serially connected containers, with the necessary auxiliary equipment, such as heat exchange means, fluid control means, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Examples

Into a primary reaction container a mixture of 12.9 parts by volume of 1-methoxybutene-(1)-yne-(3), 17.1 parts by volume of methanol and 3 parts by volume of a 1.25% solution of sulfuric acid is introduced. To initiate the reaction the container is externally heated to 70° C. During the course of the reaction sufficient heat will be generated inside the container to keep its temperature between 70 and 72° C. Further external heating will then be unnecessary. Excessive reaction heat is carried away by a reverse flow cooler. The reaction container is equipped with means whereby the reaction product can be withdrawn continuously from the kettle. Upon quickly cooling the reaction product to room temperature after removal from the container, and immediately neutralizing same, the 1-methoxybutenone-(3) content, upon being worked up in the 3-ketobutyraldehyde-dimethylacetal-(1) amounts to 14% by weight of the acetal.

If, on the other hand, the reaction product is not immediately neutralized, the following contents are obtained after the low temperature reaction.

| Subsequent reaction in hours: Temperature, 20° C. | 2 | 4 | 6 | 8 | 24 | 48 |
|---|---|---|---|---|---|---|
| 1-methoxybutenone-(3) content in 3-ketobutyraldehyde-dimethylacetal-(1) in percent | 4.9 | 3.5 | 3.2 | 2.8 | 2.3 | 2.3 |

It is believed that the foregoing tests demonstrate the unexpected superiority of the present process over the process of German Patent 881,941. The latter process is conducted at elevated temperature, preferably 60–75° C. and without the essential additional low temperature step of the present invention.

It is known that 3-ketobutyraldehyde-dimethylacetal-(1) is an important intermediate for the manufacture of dyestuffs and pharmaceutically active substances. For a specific example of how to use 3-ketobutyraldehyde-dimethylacetal-(1), reference can be made to K. Eiter and E. Truscheit, Zeitschrift für Angew. Chem. 72, 955 (1960).

In addition to using methyl alcohol as a reactant, equivalent alcohols are employable to make the corresponding acetals.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitable, and intended to be, within the full range of equivalent of the following claims.

What is claimed is:

1. A process for the production of 3-ketobutyraldehyde-dimethylacetal-(1), which process comprises (1) reacting 1-methoxy-butene-(1)-yne-(3) with methanol and water in the presence of a mineral acid at a temperature of about 60–75° C., thereby yielding said 3-ketobutyraldehyde-dimethylacetal-(1) and as a by-product 1-methoxybutenone-(3); (2) lowering the reaction temperature to about 0–30° C., and (3) maintaining the reaction mixture at 0–30° C. for a sufficient time to react said 1-methoxybutenone-(3) by-product with methanol present in said mixture, thereby forming additional 3-ketobutyraldehyde-dimethylacetal-(1) product and reducing the concentration of said by-product therein, and then (4) neutralizing the reaction mixture.

2. The process of claim 1, wherein the reaction mixture is maintained at 0–30° C. for at least 4 hours.

3. The process of claim 1, wherein the reaction mixture is maintained at 0–30° C. for at least 8 hours.

4. A process for the production of 3-ketobutyraldehyde-dimethylacetal-(1), which process comprises (1) reacting 1-methoxy-butene(1)-yne-(3) with methanol and water in the presence of a mineral acid at a temperature of about 60–75° C., thereby yielding said 3-ketobutyraldehyde-dimethylacetal-(1) and as a by-product 1-methoxybutenone-(3); (2) lowering the reaction temperature to about 5–20° C., and (3) maintaining the reaction mixture at 5–20° C. for a sufficient time to react said 1-methoxy-butenone-(3) by-product with methanol present in said mixture, thereby forming additional 3-ketobutyraldehyde-dimethylacetal-(1) product and reducing the concentration of said by-product therein, and then (4) neutralizing the reaction mixture.

5. The process of claim 4, wherein the reaction mixture is maintained at 5–20° C. for at least 4 hours.

6. The process of claim 4, wherein the reaction mixture is maintained at 5–20° C. for at least 8 hours.

References Cited by the Examiner

FOREIGN PATENTS

| | | |
|---|---|---|
| 509,930 | 2/1955 | Canada. |
| 881,941 | 7/1953 | Germany. |
| 6,809 | 1962 | Japan. |

LEON ZITVER, *Primary Examiner.*

DANIEL D. HORWITZ, *Assistant Examiner.*